(12) United States Patent
Badenell et al.

(10) Patent No.: US 7,685,598 B1
(45) Date of Patent: Mar. 23, 2010

(54) DESKTOP APPLICATION FRAMEWORK

(75) Inventors: Jon Edward Badenell, Marietta, GA (US); Monisha Longacre, Smyrna, GA (US)

(73) Assignee: The Weather Channel, Inc., Atlanta, GA (US)

( * ) Notice: Subject to any disclaimer, the term of this patent is extended or adjusted under 35 U.S.C. 154(b) by 940 days.

(21) Appl. No.: 10/745,206

(22) Filed: Dec. 23, 2003

(51) Int. Cl.
  *G06F 9/46* (2006.01)
  *G06F 9/44* (2006.01)

(52) U.S. Cl. .................. 718/104; 717/173; 719/310

(58) Field of Classification Search ............... 719/312, 719/328, 310; 718/104; 717/173
  See application file for complete search history.

(56) References Cited

U.S. PATENT DOCUMENTS

| | | | | |
|---|---|---|---|---|
| 5,495,411 A * | 2/1996 | Ananda | ..................... | 705/32 |
| 5,649,105 A * | 7/1997 | Aldred et al. | ............... | 709/220 |
| 5,918,228 A * | 6/1999 | Rich et al. | ..................... | 707/10 |
| 5,926,624 A * | 7/1999 | Katz et al. | ................. | 709/217 |
| 6,073,124 A * | 6/2000 | Krishnan et al. | ............. | 705/59 |
| 6,101,607 A * | 8/2000 | Bachand et al. | ............... | 726/17 |
| 6,189,146 B1 * | 2/2001 | Misra et al. | ................. | 717/177 |
| 6,327,562 B1 * | 12/2001 | Proust | ........................ | 704/219 |
| 6,360,366 B1 * | 3/2002 | Heath et al. | ................. | 717/178 |
| 6,385,652 B1 * | 5/2002 | Brown et al. | ................ | 709/227 |
| 6,438,468 B1 * | 8/2002 | Muxlow et al. | .................. | 701/3 |
| 6,529,950 B1 * | 3/2003 | Lumelsky et al. | ........... | 709/218 |
| 6,598,224 B1 * | 7/2003 | Maeda et al. | ............... | 717/174 |
| 6,718,549 B1 * | 4/2004 | Narin et al. | ................. | 717/178 |
| 6,816,882 B1 * | 11/2004 | Conner et al. | ............... | 709/203 |
| 6,983,258 B1 * | 1/2006 | Tye et al. | ....................... | 705/37 |
| 7,082,555 B2 * | 7/2006 | Toyooka et al. | ............... | 714/48 |
| 7,123,974 B1 * | 10/2006 | Hamilton | ...................... | 700/87 |
| 2003/0126181 A1 * | 7/2003 | Young | ........................ | 709/100 |
| 2004/0034860 A1 * | 2/2004 | Fernando et al. | ............ | 719/315 |

* cited by examiner

*Primary Examiner*—Meng-Ai An
*Assistant Examiner*—Camquy Truong
(74) *Attorney, Agent, or Firm*—Lawrence A. Aaronson, P.C.

(57) ABSTRACT

Systems and methods of providing a desktop framework. The desktop framework may include an application framework component that includes a set of core libraries that provide desktop applications access to data and services, a download component that maintains versions of the desktop applications and core libraries installed on a computer, and a license component that tracks data use and access. The application framework exposes APIs to provide the desktop applications with access to the data and services. The application framework serves as a platform upon which the desktop applications share common data and logic.

19 Claims, 3 Drawing Sheets

DESKTOP APPLICATION FRAMEWORK

COPYRIGHT NOTICE/PERMISSION

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in the drawings hereto: Copyright © 2003, The Weather Channel, All Rights Reserved.

FIELD OF THE INVENTION

This invention relates in general to the field of application frameworks. More particularly, this invention relates to a system and method of providing a desktop application framework that provides a foundation upon which desktop applications can build upon to enable sharing of data and consistent operation.

BACKGROUND OF THE INVENTION

As more and more users turn to the Internet for data and services, users are increasingly faced with the daunting task of installing many different desktop applications to access the data and services. Such applications include stock and news tickers, weather alerts, financial software, etc. In many instances, users are frustrated because desktop applications that are bundled together by same vendor often operate in a dissimilar, unintuitive manner. Also, the applications often access the data and services individually, rather than in a cooperative fashion, which creates addition requests to the vendor's servers for data.

In addition, it is difficult for developers to write applications that interact in a consistent manner with other applications that each access a common set of data and services. Developers, large and small, also have problems in making their latest software applications available for download as it is hard to publicize new versions of applications to end-users. Thus, it would be beneficial if developers had access to a consistent, multi-platform, multi-language interface to data and services that implement a standard business logic and provided an application catalog to end-users. The present invention provides such a solution.

SUMMARY OF THE INVENTION

The present invention is directed to systems and methods of providing a desktop framework. The desktop framework may include an application framework component that includes a set of core libraries that provide desktop applications access to data and services, a download component that maintains versions of the desktop applications and core libraries installed on a computer, and a license component that tracks data use and access. The application framework exposes APIs to provide the desktop applications with access to the data and services, and wherein the application framework serves as a platform upon which the desktop applications share common data and logic.

According to a feature of the invention, the application framework provides for retrieval, storage and presentation of the data to the desktop applications. The application framework may also include a user interface for collecting system-wide configuration information. In addition, a local database may be provided such that the application framework may maintain a current state of the data and tasks that are executed in accordance with predetermined rules.

In accordance with another feature, the download component provides for browsing, installing and updating of the desktop applications. The download component may also provide for authentication and verification of downloaded files prior to installation. Still further, a software catalog may display available software for download for an operating system on which the desktop framework is running. A version manager may determine if versions of the desktop applications are newer than those presently installed are available for download. A verifier may determine if download software is authentic via checksums and encryption keys.

According to another feature, the license component restricts access to the desktop framework to authorized ones of the desktop applications.

In accordance with another aspect of the invention, there is provided a system for providing services to end-users that includes a server, a desktop framework, and at least one desktop application. The desktop framework accesses data on the server in accordance with predetermined rules and authorization, and the desktop application calls the desktop framework for the data in order to provide the services to end-users.

In accordance with a feature of the invention, the desktop framework includes an application framework component that includes a set of core libraries that provide desktop applications with access to data and services, a download component that maintains versions of the desktop applications and core libraries installed on a computer, and a license component that tracks data use and access. The application framework serves as a platform upon which the desktop applications share common data and logic.

In accordance with another aspect of the invention, there is provided a method of providing a desktop framework having an application framework that serves as a platform upon which desktop applications share common data and logic. The method includes providing desktop applications access to data and services via said application framework; maintaining versions of the desktop applications and core libraries installed on a computer; and tracking use and access of the desktop applications via a licensing component.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

Exemplary Computing Environment

Figure 1:
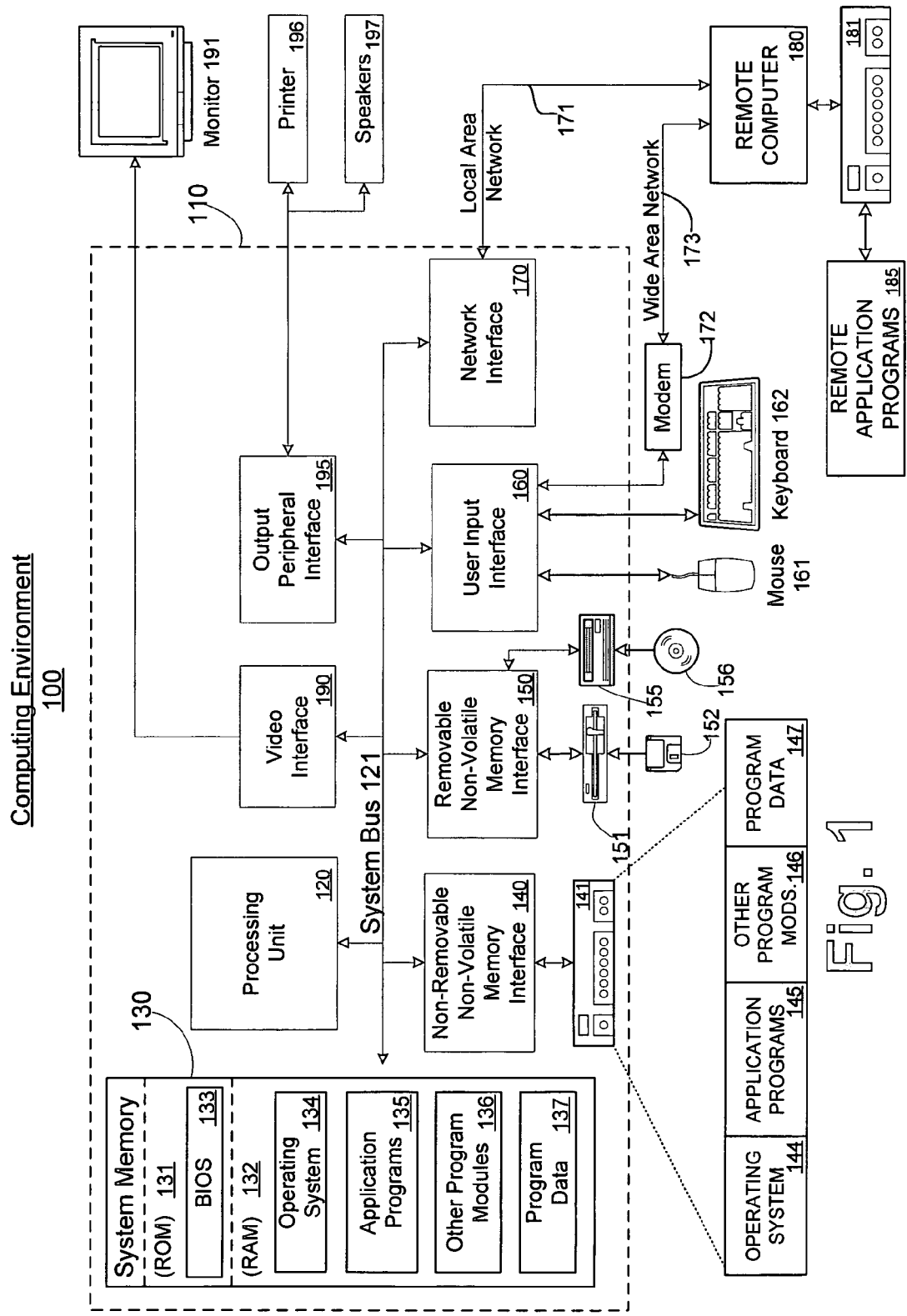
FIG. 1 is a block diagram showing an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and non-volatile media, removable and non-removable media. By way of example, and not limitation, computer readable media may comprise computer storage media and communication media. Computer storage media includes both volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or non-volatile memory such as ROM 131 and RAM 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/non-volatile computer storage media. By way of example only, FIG. 1 illustrates a hard disk drive 141 that reads from or writes to non-removable, non-volatile magnetic media, a magnetic disk drive 151 that reads from or writes to a removable, non-volatile magnetic disk 152, and an optical disk drive 155 that reads from or writes to a removable, non-volatile optical disk 156, such as a CD-ROM or other optical media. Other removable/non-removable, volatile/non-volatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Embodiments of the Present Invention

The present invention is directed to a set of libraries and user interface elements that provide information (e.g., weather), installation, and registration services for a particular operating system as a desktop framework. The desktop framework itself is not an end-user application, but rather a foundation for desktop applications to build upon so that they can share data and operate in an efficient and consistent way. The desktop applications are typically distributed via the Internet using known protocols and delivery mechanisms. While distinct for each platform, one of ordinary skill in the art will recognize that the desktop framework can be written for any operating system, such as Microsoft Windows, Macintosh OS X, Linux, or embedded PDA and cell phone operating systems.

In accordance with the present invention, there are two classes of "users" of the desktop framework. The first class is end-users. End-users receive consistent and efficient components that a variety of applications on their computer can use. The applications are registered and configured within the operating system environment in a standard fashion. The applications are preferably automatically updated and users can install new applications, as they become available, at the click of a button.

The second class of "user" for the desktop framework is developers creating applications that use the common data (e.g., weather information) that is manipulated and displayed by the applications. The developers, thus, will have access to a consistent, multi-platform, multi-language interface to the data that implements a common business logic. In addition, because applications are one or two clicks away from installation through the Application Catalog feature of desktop framework, which will be described below, this advantageously speeds the publication and delivery of new applications to end-users.

Figure 2:
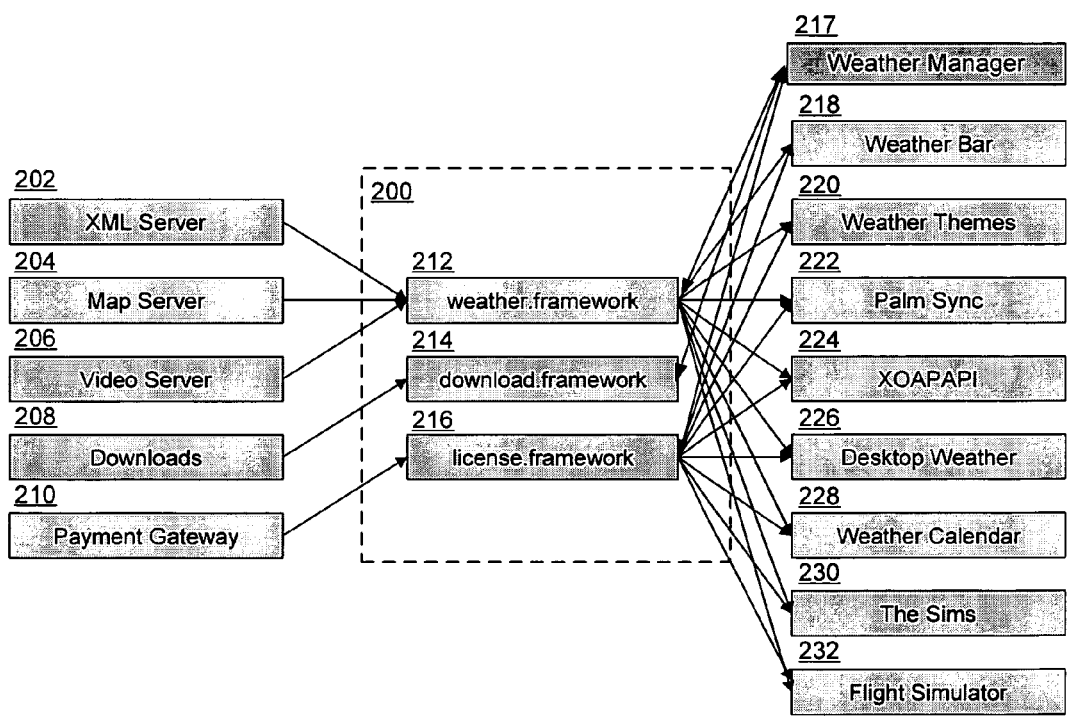
FIG. 2 is an overview of the various components of a desktop framework in accordance with the present invention.

Referring to FIG. 2, there is shown an overview of the components that interact with the desktop framework 200. According to the exemplary embodiment described hereinbelow, the desktop framework 200 provides a platform upon which to build weather-related applications. Weather information is provided by The Weather Channel's weather.com Web site and is made available to any application that is licensed to use the data. In accordance with the framework, all applications have a consistent and reliable interface for the data. While the embodiment below is described with respect to weather data and applications, it is noted that other types of data and applications will benefit by operating within the framework 200.

Servers 202-210 provide data, application downloads and licensing to the desktop framework 200 via a wide area network (WAN) such as the Internet. In the present embodiment, weather data is served by an XML Server 202, images come from a Map Server 204, and videos would be produced by a Video Server 208. There would also be a collection of client applications that are stored on download servers 208. A payment gateway 210 provides a communications connection with a third party payment service to enable end users to purchase additional applications and services.

Figure 3:
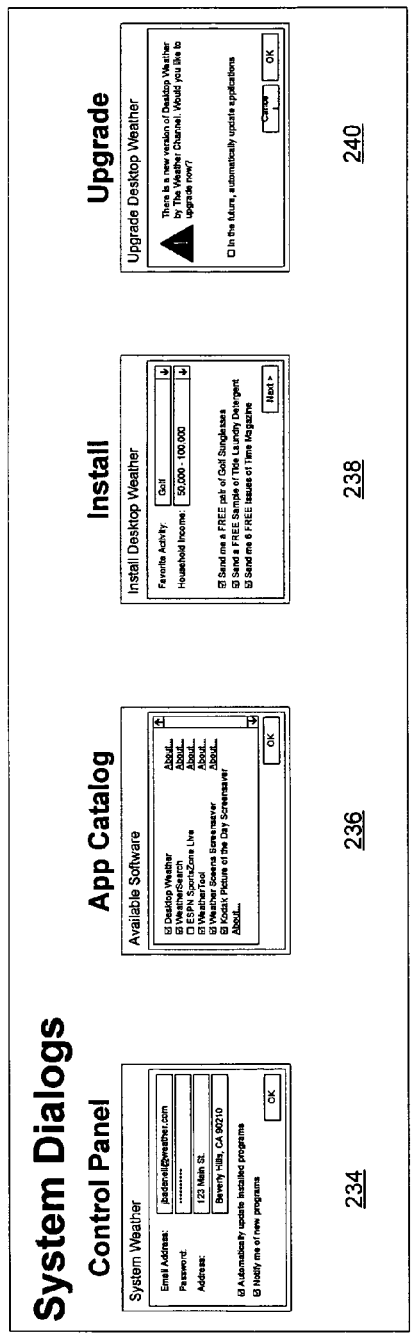
FIG. 3 are exemplary user interfaces of system dialogs.

The components, libraries and user interface elements of the desktop framework 200 will now be described with reference to FIGS. 2 and 3. The framework components themselves are divided between a system-level user interface and collection of shared libraries implementing desktop application services. These services include the retrieval, storage, and presentation of weather data, the browsing, install; and updating of desktop applications; and the authentication and verification of downloaded files prior to installation.

A weather.framework 212 component is an application framework that provides the core libraries that are installed on the user's computer. The weather.framework 212 provides the ability for other programs to request weather data in one or more of the operating system's native formats. The weather.framework 212 encapsulates system level access to current and cached weather data from weather.com's services. Using only a single instance of weather information on the user's computer increases consistency and improves efficiency of both the client and server.

The weather.framework 212 state engine maintains the current state of the data model and tasks that need to be executed according to predefined rules. An example of a state-related task is the need to fetch current conditions every 30 minutes. A weather.framework cache holds weather data locally on the user's machine in accordance with rules defining the aging of the cache. This reduces load on the server and allows applications to use some information even when the computer is not connected to the Internet.

The weather.framework 212 resources include icons and translation tables to correctly present the weather data. Having the resources locally reduces the server load and bandwidth and allows the icons and imagery to be used when the computer is not connected to the Internet. Framework Meta-APIs are language independent specifications of the functions and data types for a given framework. External APIs then implement these functions and data types in a given language and for a given Operating System. For example, desktop framework applications may access weather data through weather framework APIs such as: C++ (Windows, Linux), .Net (Windows), Cocoa (Macintosh), JavaScript (DHTML) and Java (Server Applications).

The user interface for the weather.framework 212 is a set of dialog boxes that collect user preferences for system-wide weather configuration. A preferences dialog collects user information such as: Location, Units, and Display of Severe Weather Alerts. A weather.framework key may be used that is a cryptographic license verifying the identity of the framework and allowing it access to the weather.com services.

The connection between the weather.framework 212 and the Weather Servers 202-208 could be on-demand or always-open, allowing for true push alerts and even push-weather. The weather.framework 212 also implements a local weather database with cached results to previous queries. As an alternative, the weather.framework 212 may implement peer-to-peer connections between clients to collect and distribute weather data in order to reduce the bandwidth and resource burden on the servers 202-208.

A download.framework 214 component is responsible to maintaining the versions of the software installed on the user's computer. The download.framework 214 updates the weather.framework 212 as new versions of files are released and allows users to install new software without using a web browser or other connection to the Internet.

The download.framework 214 contains the core user interface and system processes to download and install new and updated applications. The User Interface provides the user dialogs to register, download, and configure framework applications from the application catalog. A System Preferences dialog 234 preferably conforms to the Operating System's standards for control-panels and contains global configuration settings such as: Username, Password, Address, Age, Gender, Auto-Update, Auto-Notify, and Network Settings. In addition to being stored locally, the information may be communicated back to an XML URS database server. The URS database servers is a Universal Registration System. It contains all user and product preferences in a centralized database at weather.com (or other service provider). Framework products preferably collect data from the user and send it to URS for centralized storage and authentication.

A Software Catalog 236 displays all of the software available for that Operating System and indicate what software is currently installed. Additionally, the catalog will provide descriptions of the products. If the user has selected to be notified when new versions of the installed software are available, an Update Notification dialog 240 will alert them when the software catalog is updated. If the user has selected to be notified when new software is added to the catalog, a New Application Notification dialog will alert them when the software catalog is updated.

A Version Checker uses the framework's list of installed applications on the user's computer and checks periodically with the download server 208 to determine if there are new or updated products available for that Operating System. If new or updated software is the software either automatically installed or the user is notified of the update. A Downloader downloads new applications and software updates to the user's computer. It can do this interactively, when the user chooses to install new software from the Catalog, or in the background, when an update becomes available for software that is already installed. A Verifier uses checksums and encryption keys to verify that the downloaded software is authentic and not corrupt before it is installed.

An Installer 238 installs new or updated software on the user's computer. It will also uninstall any framework software the user wants to remove. A Download Framework key is used to verify the authenticity of the framework components, since the Download Framework has the ability to update itself. A Framework Uninstaller is a separate, external program that allows the user to uninstall all desktop framework components.

A license.framework 216 component is responsible for keeping track of data use and registration information. Some data may be provided free of charge and other data may require a subscription. Similarly, some allocations may require registration and opt-in co-registration, while others may have paid advertising in them. The license.framework 216 component interacts with URS and billing to maintain the user's profile and, in the case of subscription products, bill them accordingly.

The license.framework 216 provides an interface to or its own implementation of, standard cryptographic libraries necessary for SSL and other encrypted network communications. Also, it provides an interface to or its own implementation of the client components of a Public Key Infrastructure (PKI) that allows authentication and verification of programs downloaded to a user's computer. The license.framework 216 also provides the framework for securing access to desktop framework data and restricting the programs that use the framework APIs.

The download.framework 214 communicates with the download services over SSL and the registration and co-registration transactions for individual application use SSL to protect user data. The content provided may generate its own SSL certificates for the SSL transactions. The content provider may also have its own certifiers and will issue certificates to each Framework and framework application. The frameworks will be able to verify the validity of an application using its public key and allow or deny access to the data accordingly. The license.framework 216 will also have its own key to verify its authenticity.

Thus, the framework components 212-216 in this embodiment reside on top of the services architecture (i.e., servers 202-210). By using common services and assets such as the weather XML feeds, maps, and URS, the desktop framework 200 will remain current with other services and leverage the web, wireless, and broadband development efforts.

Figure 4:
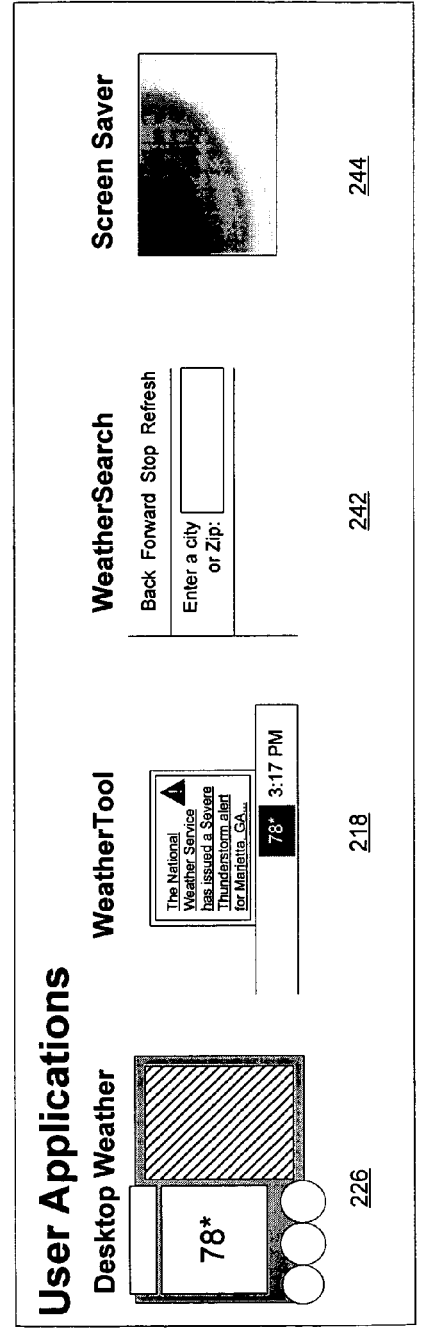
FIG. 4 are exemplary user interfaces of user applications.

Referring now to FIGS. 2 and 4, many different desktop applications may be developed to interact with the desktop framework 200. The exemplary applications described herein are not intended to limit the scope of the present invention as many additional applications may interoperate with the desktop framework 200. In accordance with an advantageous aspect of the invention, the number of applications installed on a user's computer does not affect the number of requests made to the servers 202-208 as there is only one instance of the desktop framework 200, which would make only one group of requests.

A Weather Manager 217 application serves to control the overall interaction between the user, the operating system, and the framework 200. The Weather Manager 217 may be implemented as a Windows Control Panel or MacOS Preferences Pane that enables the user to set global settings, such as location and username. The Weather Manager 217 may also have feature listing applications that are available, and would use the download.framework 214 component to install them.

A Weather Bar 218 is an application that provides the temperature in the system tray. The Weather Bar 218 may provide alerts to the user with a "Toast" pop-up window and an audio alert if there is a severe weather alert for their location, as shown in FIG. 4. The Alert Toast window opens and notifies the user of a severe weather alert that has been issued for their location by the National Weather Service. If the user clicks on the message in the alert toast, the Weather Bar 218 may open a main window of a main desktop weather application 226 and switches to an Alerts Tab. If the desktop weather application is not installed, the weather bar 218 may open the default browser to weather.com's page for that location and its alert.

A Weather Themes application 220 may be desktop backgrounds and color schemes that change depending on the weather or forecast. A Palm Sync application 222 provides a PalmOS Sync Conduit for a Palm Weather application. The Palm application itself is developed separately from the desktop OS application, but the download.framework 214 component may install it and the license.framework 216 component could bill for it together with the Palm Sync application 222.

An XOAPAPI application 224 (XML-OAP-API), is a Software Developer's Kit (SDK) allowing third-parties to develop applications for the desktop framework 200. XOAPAPI may also administer downloads and revenue sharing with partners who license data for desktop applications, while retaining control for the licensor to collect and retain registration information for the users.

A Desktop Weather application 226 may utilize the weather.framework 212 and download.framework 214 functionality to obtain data from the servers 202-208. The desktop weather application acts as the main interface to the data, as shown in FIG. 4, and may be the distribution tool to provide the framework 200 to user's computers. For example, users may download the Desktop Weather application 226 from the weather.com Web site. A Weather Calendar 228 may place weather data in a user's calendar and or Personal Information Management (PIM) applications.

While applications 217-228 are directed to common uses of weather data (albeit now advantageously implemented within the framework 200), there are other uses for weather data. The Sims 230 is a game in which virtual people live virtual lives. The people get houses and jobs and all sorts of other things, but there is no weather. The framework 200 can provide weather to The Sims 230. In this instance, the license.framework 216 component may not necessarily interact with the individual user, rather it may allow programs/developers to license data and bill user's separately. Another example are flight simulator games 232, which generally do have weather. However, with the framework 200, the flight simulator games 232 could be real-time weather data.

Other applications may be an off-line browser that would store any previously received weather data so that the framework applications could run even when the computer was not connected to the Internet. The desktop framework 200 may also provide full two-way or n-way (in the case of peer-to-peer) communication with users. This would allow the servers to interface with personal weather stations or corporate networks of stations to upload data. A Weather Toolbar 242 may be provided that install into a browser and would provide weather data and search capabilities to user's browsers.

A Weather Screensaver 244 may be provided that displays computer-generated imagery to convey current conditions or forecasts in a non-numeric fashion. In addition, new themes and seasonal imagery may be made available throughout the year. The user interface of the screensaver products consists of the imagery displayed when the screensaver is running, the install dialogs, and the configuration dialogs.

As is now clear to one of ordinary skill in the art, the download.framework component 214 and license.framework component 216 are useful for data/applications beyond weather-related data and applications. For example, news, sports, and even general software distribution can work in accordance with desktop framework 200 of the present invention.

As is also apparent, the desktop framework of the present invention provides several advantages. First, it provides a mechanism by which a family of integrated, but substantially different applications can provide more focused value to the end-users, and increase adoption of the applications Second, it allows for automatic updates, removing the problem of either forcing updates, or users manually updating the applications and framework libraries. Third, desktop framework provides easy access and up-front promotion of new products on the end-user's computer. Finally, the desktop framework encapsulates business rules associated with the data, allowing third-party developers to focus on building applications, not re-inventing the business logic.

While the present invention has been described in connection with the preferred embodiments of the various Figs., it is to be understood that other similar embodiments may be used or modifications and additions may be made to the described embodiment for performing the same function of the present invention without deviating therefrom. Furthermore, it should be emphasized that a variety of computer platforms, including handheld device operating systems and other application specific operating systems are contemplated, especially as the number of wireless networked devices continues to proliferate. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A desktop framework implemented by a computer, comprising:
   an application framework component that includes a set of core libraries that provide a plurality of desktop applications access to shared data and services;
   a download component that maintains versions of the plurality of desktop applications and core libraries installed on the computer;
   a license component that restricts access to the desktop framework at an application level, wherein said license component determines whether each desktop application in the plurality of desktop applications is authorized to access the shared data and services provided by the desktop framework using a encryption key associated with each desktop application in the plurality of desktop applications,
   wherein the desktop framework is provided as an installable application for a particular operating system as a foundation upon which the plurality of desktop applications build and includes user interface elements that provide information, installation, and registration services for the particular operating system,
   wherein said license component restricts access to the desktop framework and the shared data and services to authorized ones of the plurality of desktop applications based on the application level determination, and
   wherein said set of core libraries of the application framework component when executed by the computer expose Application Programming Interfaces to provide the authorized ones of the plurality of desktop applications access to the shared data and services;

wherein said download component provides for browsing, installing and updating of the plurality of desktop applications; and a verifier that determines if the downloaded component is authentic via checksums and the encryption key.

2. The desktop framework of claim 1, wherein said application framework component provides for retrieval, storage and presentation of the shared data to the plurality of desktop applications.

3. The desktop framework of claim 2, wherein said application framework component includes a user interface for collecting system-wide configuration information.

4. The desktop framework of claim 2, further comprising a local database, wherein said application framework component maintains a current state of the shared data and tasks that are executed in accordance with predetermined roles.

5. The desktop framework of claim 1, wherein said download component authenticates and verifies a downloaded file associated with the plurality of desktop applications prior to installation of the downloaded file.

6. The desktop framework of claim 1, further comprising a software catalog that displays available software for download for an operating system on which the desktop framework is running.

7. The desktop framework of claim 6, wherein said software catalog is displayed via said download component when an option for browsing the plurality of desktop applications is selected in said download component.

8. The desktop framework of claim 1, further comprising a version manager that determines if versions of the plurality of desktop applications are newer than those presently installed are available for download.

9. The desktop framework of claim 8, wherein said version manager provides an option for updating the plurality of desktop applications to said download component if said version manager determines new versions of the plurality of desktop applications are available for download.

10. The desktop framework of claim 1, wherein the shared data and services comprises shared weather data and weather services.

11. The desktop framework of claim 10, wherein the plurality of desktop applications comprise a plurality of weather-related applications that access the shared weather data and weather services provided by the application framework.

12. A system for providing services to end-users comprising:

a server;

a desktop framework distributed by the server to a user computing device through a distribution mechanism, the desktop framework, when executed by a user computing device, exposing application programming interfaces called by a plurality of desktop applications to provide functionalities associated with each desktop application; and a license component within the desktop framework that tracks access to the desktop framework at an application level, wherein said license component determines whether each desktop application in the plurality of desktop applications when executed on the user computing device is authorized to access the data using a encryption key associated with each desktop application in the plurality of desktop applications, wherein said license component restricts access to the desktop framework and the data to authorized ones of the plurality of desktop applications based on the application level determination, and wherein said desktop framework is a separate component from an operating system on the user computer device and accesses the data on said server in accordance with predetermined roles and an authorization, and wherein each of the plurality of desktop applications call said desktop framework for the data in order to provide said services to end-users;

wherein said desktop framework comprises an application framework component that includes a set of core libraries that provide the application programming interfaces that are exposed to the plurality of desktop applications with access to data and services; and a download component that maintains versions of the plurality of desktop applications and core libraries installed on a computer; and a verifier that determines if the downloaded component is authentic via checksums and the encryption key.

13. The system of claim 12, further comprising a local database, wherein said application framework component maintains a current state of the data and tasks that are executed in accordance with predetermined rules.

14. The system of claim 12, wherein said download component provides for browsing, installing and updating of the plurality of desktop applications.

15. The system of claim 14, further comprising a software catalog that displays available software for download for an operating system on which the desktop framework is running.

16. The system of claim 15, further comprising a version manager that determines if versions of the plurality of desktop applications newer than those presently installed are available for download.

17. A method of providing a desktop framework on a computer, the desktop framework having an application framework and a licensing component, the method comprising:

installing the desktop framework on an operating system of the computer as a foundation upon which a plurality of desktop applications build;

providing user interface elements within the desktop framework that provide information, installation, and registration services for the operating system;

providing the plurality of desktop applications access to shared data and services via said application framework;

maintaining versions of the plurality of desktop applications installed on the computer; and restricting access of the plurality of desktop applications to the desktop framework at an application level via said licensing component, wherein said license component determines whether each desktop application in the plurality of desktop applications is authorized to access the shared data and services using a encryption key associated with each desktop application in the plurality of desktop applications, and wherein said license component restricts access to the desktop framework and the shared data and services to authorized ones of the plurality of desktop applications based on the application level determination;

wherein said desktop framework comprises an application framework component that includes a set of core libraries that provide the application programming interfaces that are exposed to the plurality of desktop applications with access to data and services; and a download component that maintains versions of the plurality of desktop applications and core libraries installed on a computer; and a verifier that determines if the downloaded component is authentic via checksums and the encryption key.

18. The method of claim 17, further comprising: collecting system-wide configuration information via a user interface; and providing a local database to maintain a current state of the shared data and tasks that are executed in accordance with predetermined roles.

19. The method of claim 17, further comprising: providing a software catalog that displays available software for download for an operating system on which the desktop framework is running; and providing a version manager that determines if versions of the plurality of desktop applications are newer than those presently installed are available for download.

* * * * *